United States Patent [19]
Crahay

[11] 4,322,600
[45] Mar. 30, 1982

[54] METHOD AND APPARATUS FOR FORMING MICROCAVITIES ON THE SURFACE OF A ROLLING MILL ROLL

[75] Inventor: Jean Crahay, Francorchamps, Belgium

[73] Assignee: Centre de Recherches Metallurgiques-Centrum voor Research in de Metallurgie, Brussels, Belgium

[21] Appl. No.: 108,578

[22] Filed: Dec. 31, 1979

[30] Foreign Application Priority Data

Jan. 15, 1979 [LU] Luxembourg .............................. 80792

[51] Int. Cl.³ ........................ B23K 26/06; B23K 26/14
[52] U.S. Cl. ........................ 219/121 LK; 219/121 LH; 219/121 LL; 219/121 LS; 219/121 LT; 219/121 FS
[58] Field of Search .... 219/121 L, 121 LM, 121 LH, 219/121 LJ, 121 LG, 121 LN, 121 LK, 121 LL, 121 LS, 121 LT, 121 FS; 346/76 L

[56] References Cited

U.S. PATENT DOCUMENTS

| | | | |
|---|---|---|---|
| 3,404,254 | 10/1968 | Jones | 219/121 LH X |
| 3,636,251 | 1/1972 | Daly et al. | 219/121 LH X |
| 3,679,863 | 7/1972 | Houldcroft et al. | 219/121 FS X |
| 3,749,878 | 7/1973 | Sullivan et al. | 219/121 LG |
| 4,083,629 | 4/1978 | Kocher et al. | 219/121 LC X |
| 4,131,782 | 12/1978 | Einstein et al. | 219/121 LL |
| 4,170,726 | 10/1979 | Okuda | 219/121 FS X |
| 4,186,619 | 10/1980 | McArthur et al. | 219/121 LT X |

OTHER PUBLICATIONS

Eleccion, M. "Materials Processing With Lasers", *IEEE Spectrum*, Apr., 1972, pp. 62–71.

*Primary Examiner*—B. A. Reynolds
*Assistant Examiner*—M. Paschall
*Attorney, Agent, or Firm*—Holman & Stern

[57] ABSTRACT

A continuous beam from a laser is divided into two intermittent beams by a reflecting disc with peripheral holes, rotating about an axis skew to the continuous beam. At least one of the intermittent beams is transmitted to a marking head having a lens which focuses the beam onto the surface of a roll. The roll is rotated and the marking head is moved along the roll, in synchronism with the rotation of the disc, so that a regular hexagonal lattice of microcavities is cut by the focused intermittent beam. The second intermittent beam may be used to cut microcavities in the roll or in a second roll or for other purposes.

22 Claims, 4 Drawing Figures

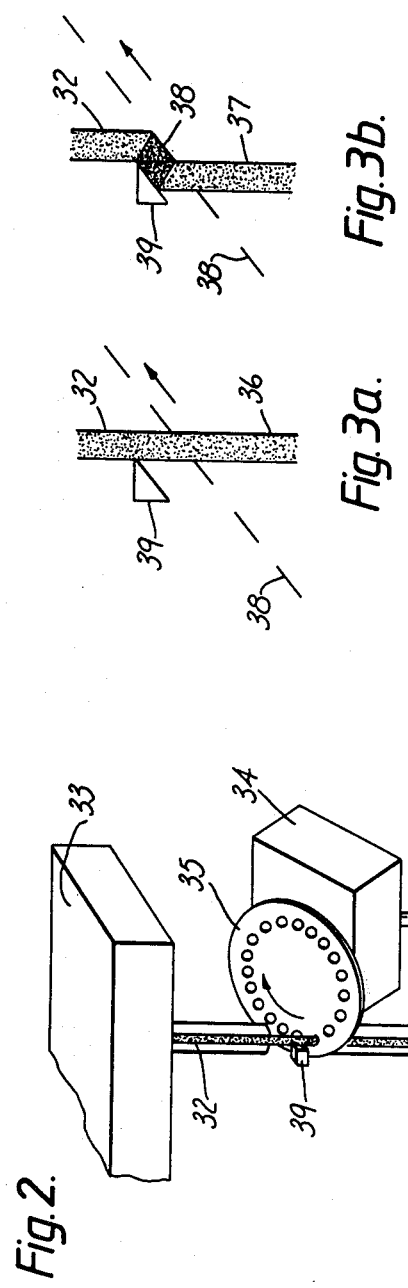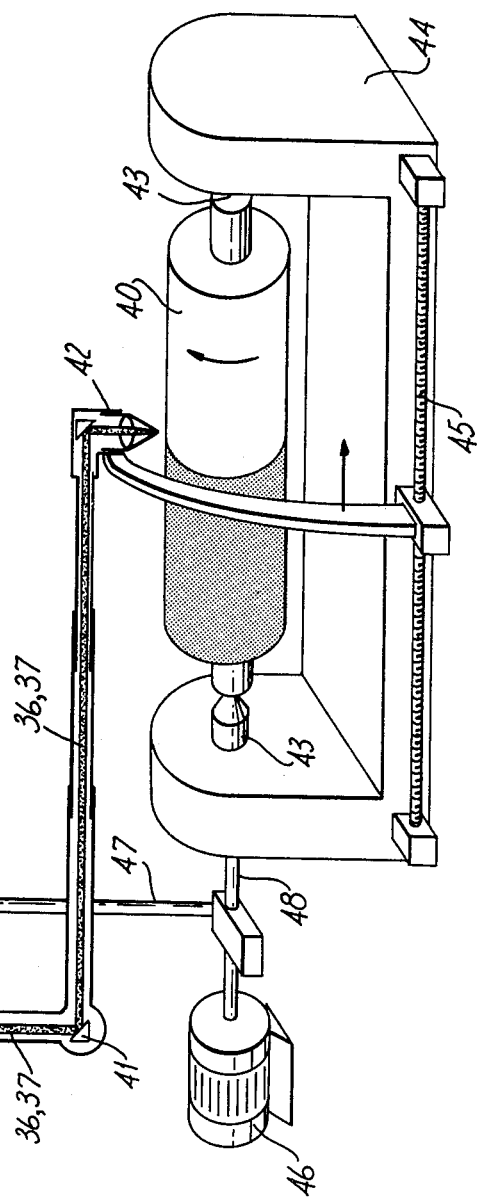

METHOD AND APPARATUS FOR FORMING MICROCAVITIES ON THE SURFACE OF A ROLLING MILL ROLL

The present invention relates to a method and apparatus for forming microcavities according to a predetermined pattern on the surface of a rolling mill roll by means of a laser beam.

Rolls with microcavities are capable of endowing thin steel sheet with a suitable morphology for improving its properties and in particular its suitability for deep-drawing, as a result of contact with the rolls.

We have been able to ascertain, during a large number of tests, that a final morphology of this type could only be obtained if the microscopic depressions in the roll were uniformly distributed over its entire surface, without interruption, and were of nominal dimensions of 2 to 15 microns in height and 30 to 250 microns in plan.

The use of a laser beam for obtaining these microcavities provides the advantages of a large degree of flexibility in operation, of high precision and of considerably reduced power consumption. Although there are other methods of obtaining microcavities, in particular mechanical, pneumatic, and chemical methods, we have chosen the laser beam for the advantages which it provides, which are clearly greater than those of the other methods just mentioned.

The present invention provides apparatus for forming microperforations on the surface of rolling mill rolls, comprising:

a continuous laser, preferably a $CO_2$ laser;

a rotary disc dividing the laser beam, the periphery of which disc comprises reflecting surfaces separated from one another by means enabling passage of the laser beam, means for rotating the dividing disc about an axis inclined with respect to the direction of the continuous beam, at least one marking head containing a lens for focusing the laser beam on a point of the surface of the cylinder and possibly a blow pipe for a suitable gas, deflectors, such as mirrors, in order to ensure the variations of direction and/or position of the beam between the movable screen and the inlet aperture in the marking head, without causing any deterioration to the qualities of the beam, means for providing a distribution of suitable geometric shape to the points successively cut into the surface of the roll.

The dividing disc acts on the non-concentrated laser beam, which is advantageous in that it avoids heating problems and maintains a beam which is only very slightly divergent after reflection. A further advantage of this mechanical divider is to enable frequencies of several thousand hertz to be obtained, these frequencies not being at present available with a pulsed laser. This divider is also highly advantageous in that its displacement may be synchronised with that of the roll to be treated. Synchronisation of this type would not be possible if the beam was pulsed at its source or interrupted by an optical apparatus (Kerr cell, for example).

In one embodiment of the invention, the apparatus comprises two marking heads in order to concentrate the intermittent beams on one point of the surface of a single rolling mill roll, or on two rolls. When the apparatus comprises two marking heads for concentrating the intermittent beams on the surface of a single roll, one of these beams may be used either to prepare the microcavity to be cut, or to finish the cutting of the microcavity or to cut further microcavities. When the apparatus comprises two marking heads for concentrating the intermittent beams on the surfaces of two rolls, it is obviously necessary to double the means designed to provide a distribution of suitable geometric shape to the points successively cut in the two rolls.

In addition to the cutting, preparation, and finishing of microcavities, the intermittent beam deflected by the divider may be focused so as to cause preheating of the zones to be cut or quenching of the zones which are not directly touched by the concentrated beam. This phenomenon in any case takes place automatically in the region of the roll located immediately below the microcavity; this region is thermally affected by the perforating beam and so undergoes a very powerful quenching effect (since the heat is rapidly removed by the surrounding body of metal) which provides it with a greater hardness than that of the non-affected portions, even in the case of a roll which has been quenched previously.

In accordance with another embodiment the marking head is composed of two portions, viz. a support portion comprising a deflector for directing the laser beam towards the roll to be treated and a head portion containing the focusing lens, and possibly a blow pipe, the support portion being rigid with a mechanism for translation parallel to the longitudinal axis of the roll, the head portion being rigid with the support portion by way of a connection which enables the head portion to move solely in a direction perpendicular to the surface of the roll, and the head portion also being provided with a runner, e.g. a free roller, designed to run along the surface of the roll.

As regards the focusing lens, a beam diameter of 60 microns may be obtained at the focus of a lens with a focal length of 60 mm.

The focal length of the lens not only determines the beam diameter at the focus, but also the depth of the field, this depth decreasing when the focal length decreases.

As regards the blow pipe, this accessory serves either to facilitate perforation, by supplying a cutting gas, such as oxygen, when the microcavities are cut directly into the steel of the roll, or to protect the metal to be perforated, by supplying an inert gas, such as argon, when the microcavities are cut into a coating layer on the roll. In the latter case, perforation of the coating layer is followed by chemical or electrochemical action at the points at which the steel of the roll is left uncovered.

The presence of the free roller designed to run over the surface of the roll to be treated enables microcavities to be obtained on rolls of varying diameter, as well as on rolls whose camber is greater than the depth of field of the lens.

Mirrors designed to guide the laser beam from the laser to the surface of the roll may for example be constituted by polished aluminium or covered with gold. In order to protect these mirrors against dust, they may be enclosed in a casing provided with inlet and outlet apertures for the beam. Clean air is supplied to the interior of this casing in order to create a slight overpressure in such a way that this air prevents dust from entering the casing.

According to an advantageous embodiment, a distribution of suitable geometric shape of the microcavities successively cut in the surface of the roll is ensured by a mechanism for rotating the roll about its longitudinal axis and a mechanism for translation of roll or the marking head parallel to the longitudinal axis of the roll. The mechanism for translation parallel to the longitudinal axis of the roll may comprise a system of slide grooves or rollers or an air cushion system, for example. The rotation of the roll is advantageously obtained by placing the roll on blocks or between points, for example.

The apparatus preferably comprises means for synchronising the following:
translation of the roll or the marking head on one hand, and rotation of the roll on the other hand,
rotation of the dividing disc on one hand and rotation of the roll on the other hand.

In addition, the direction, sense, and speed of rotation of the roll are selected so as to enable synchronisation with the mechanism for rotating the disc which divides the laser beam.

The synchronisation of two mechanisms may be carried out by way of the individual motors and transmissions of each mechanism or a variant thereof, and more precisely the synchronisation means may advantageously comprise a single motor for the two mechanisms and suitable non-sliding transmissions, such as worm-screws or toothed gears.

The present invention also relates to a method for implementing the above apparatus. In this method a continuous laser beam is emitted, and is of sufficient power to cause a local destruction of the material constituting the roll or of a coating preliminarily deposited on the roll, this continuous beam is converted into at least one intermittent beam, the intermittent beam obtained in this way is focused on the surface to be treated, and the whole of this surface is scanned along a path which ensures a distribution of suitable geometric shape to the microcavities cut successively in the surface of the roll.

The laser beam preferably has a wavelength of about 10 microns (far infrared).

In the case in which the beam used is required to destroy the material constituting the rolling mill roll, the preferred power is 500 to 3000 W. If the beam is only used to destroy the material constituting a coating preliminarily deposited on the roll, the required power may be only 10 to 50 W.

It may be useful to be able to cut microcavities of varying sizes in terms of the position of the microcavity on the surface of the roll. For this purpose the electrical power injected into the laser is modified, a power increase causing an increase in size. In particular, the size of the microcavities cut in the surface of the roll is varied according to a determined dispersion, by varying the electrical power injected into the laser about a predetermined mean value.

Preferably, the continuous beam is transformed into two intermittent beams one of which is used to cut the roll and the other is used for one of the following purposes: starting perforation, cutting the same roll, cutting a second roll, preheating or quenching of the roll, absorption into a suitable medium.

When the microcavities are cut directly into the steel constituting the bulk of the roll, a gas such as oxygen may be blown in to facilitate this operation at the points where the cavities are cut. When the microcavities are cut into a coating preliminarily deposited on the roll, a protective gas such as argon may be blown in at the points at which the holes are cut.

Preferably, at each instant a relative pause between the point of the roll at which the microcavity is cut and the point of impact of the radiation on the roll is ensured by synchronising the rotary movements of the roll and the dividing disc (direction, sense, and speed).

Such synchronisation implies that—
the movement of the point on the roll at which the microcavity is cut and the movement of the dividing disc (as seen from the roll by way of the focusing lens and the intermediate deflecting means) have the same direction,
the sense of these movements is chosen as a function of the characteristics of the focusing lens and of the position of its focal point relative to the surface to be treated,
the linear peripheral speeds $v_1$ of the dividing disc and $v_2$ of the roll are connected as absolute values by the formula $v_1/v_2 = d_1/d_2$, in which $d_1$ = the diameter of the beam leaving the dividing and $d_2$ = the diameter of the focused beam at the roll; any inaccuracy in respect of this relationship results in the microcavities cut in the surface of the roll becoming oval in shape.

Preferably, scanning of the whole of the surface of the roll takes place along a uniform helical path about the longitudinal axis of the roll by synchronising the movement of translation of the marking head or of the roll and the movement of rotation of the roll. According to a particularly advantageous embodiment, each group of microcavities is distributed in the form of a regular hexagon. A regular hexagonal distribution can be obtained by synchronising the rotary movements of the dividing disc and the roll, in such a way that the passage of $n + \frac{1}{2}$ reflecting regions or transmitting regions corresponds exactly to one rotation of the roll, the helical pitch being adapted to the distance between two successive microcavities.

The invention will be described further, by way of example, with reference to the accompanying drawings, in which:

FIG. 2 is similar to FIG. 1 and shows the treatment of a single roll; and

Figure 1:
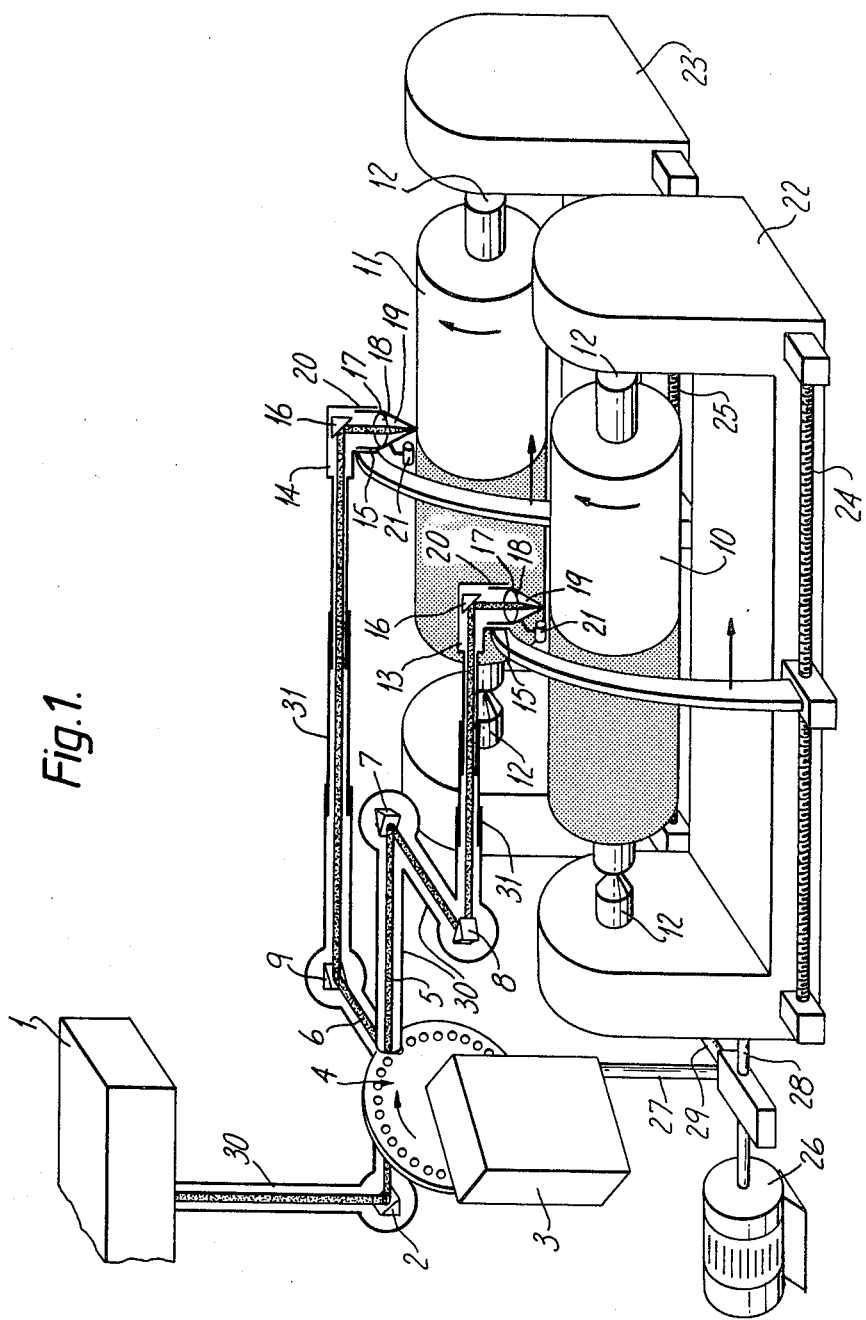
FIG. 1 is a diagrammatic perspective view of apparatus for treating mill rolls, showing the simultaneous treatment of two rolls.

FIG. 3 diagrammatically illustrates the division of a laser beam.

According to FIG. 1, a continuous beam (shown by shading) emerges vertically from a laser 1 and is then deflected to the horizontal by a mirror 2 in order to reach a divider 3. The divider 3 comprises a disc 4 having at its periphery a series of reflecting regions separated from one another by holes. The disc 4 is disposed obliquely to the beam which it intercepts, and rotates at high speed. Under the action of the disc 4, the continuous beam is divided into two intermittent beams 5,6, one beam 5 passing straight through the holes, whereas the other beam 6 is deflected by the reflecting regions.

By means of mirrors 7 and 8, the beam 5 is orientated parallel to the longitudinal axis of a roll 10. In the same way, by means of a mirror 9, the beam 6 is directed parallel to the longitudinal axis of a roll 11. The rolls 10 and 11 are supported on points 12 and rotate about their longitudinal axes. The paths of the beams 5,6 are protected by fixed sheaths 30 and telescopic sheaths 31.

The apparatus also comprises two marking heads 13 and 14 each composed of two portions, one portion 15 constituting a support comprising a mirror 16 for directing the laser beam towards the roll, and the other portion 17 comprising a focusing lens 18 and a blow pipe 19. The support 15 is displaced parallel to the longitudinal axis of the roll to be treated. The marking head portion 17 is fixed to its support 15 by way of a connection 20 which enables the head portion 17 to move solely in a direction perpendicular to the surface of the roll. In addition, the head portion 17 is provided with an idle roller 21 designed to roll over the surface of the roll in which microcavities are to be cut by the focussed intermittent beam scanning along a helical path.

The displacement of each marking head (13,14) is synchronised with the rotation of the corresponding roll (10,11) on stands 22,23, by way of worm-screws 24,25. A single motor 26 causes the disc 4 and the stands 22,23 to be driven by way of non-sliding transmissions 27,28, and 29, so as to ensure improved synchronisation of the movements.

According to FIG. 2, a continuous beam 32 (shown in shading) emerges vertically from a laser 33 and reaches a divider 34 comprising a disc 35 identical to the disc 4 of FIG. 1. Under the action of the disc 35, the beam 32 is divided into two adjacent parallel intermittent beams 36 and 37, in the manner shown in FIG. 3, in which the dashed line 38 represents the alternation of holes and reflecting regions. In FIG. 3(a) the incident beam 32 passes through the disc and continues as the beam 36 without being deflected (at a marking head 40 this beam 36 is used to cut microcavities in a roll 40).

In FIG. 3(b) the incident beam 32 is deflected by a reflecting region of the disc and then by an auxiliary fixed mirror 39 which is parallel to the disc. The deflected beam passes through the disc 35 by way of the hole adjacent to the reflecting region which is touched in the first instance and continues as the beam 37, following a direction parallel to the incident beam 32. This beam 37 is used at the marking head to commence the formation of a microcavity; of course an alternative use may be envisaged, such as preheating or continuation of a perforation which has already been started. Such uses are possible because synchronisation of the movements of the dividing disc and the roll to be treated enable the point on the roll about to reach the focusing zone of the next segment of the beam 36 to correspond to the position of the hole through which the beam 37 passes.

After having passed through the disc 35, the beams 36 and 37 are directed parallel to the axis of the roll 40 by way of a mirror 41 in order to reach the marking head 42. The head 42 comprises a mirror for directing the beams towards the roll 40, a focusing lens, and a blow pipe, as in the heads 13 and 14 of FIG. 1.

The displacement of the marking head 42 parallel to the longitudinal axis of the roll 40 is synchronised with the rotation of the roll 40 between points 43 on a stand 44 by way of a worm-screw 45. A single motor 46 drives the disc 35 and the stand 44 by way of transmissions 47 and 48, as in FIG. 1.

I claim:

1. Apparatus for forming microcavities on respective surfaces of first and second rolling mill rolls, comprising: a continuous laser; a rotary disc for dividing the laser beam into two intermittent beams, the periphery of the disc having a series of reflecting regions separated from one another by a series of transmitting regions; means for rotating the disc about an axis which is inclined with respect to the direction of the continuous laser beam, with the disc periphery intercepting the laser beam; a first marking head containing a first focusing lens for focusing a laser beam at an area on said surface of the first roll, which surface is to be moved relative to the marking head so that said area moves along the roll surface; a second marking head containing a second focusing lens for focusing a laser beam at an area on said surface of the second roll; and deflecting means for transmitting at least one of the intermittent beams from the disc to the first focusing lens and for transmitting the other of the intermittent beams from the disc to the second focusing lens.

2. Apparatus as claimed in claim 1, in which each marking head comprises a support portion having a deflector for directing an incoming laser beam from the deflecting means towards the focusing lens and a head portion which contains the focusing lens, the head portion being movable relative to the support portion along only one axis and carrying a roller for contacting the surface of the roll.

3. Apparatus as claimed in claim 1, further comprising means for rotating each roll about its longitudinal axis and for causing relative translation of each roll and its marking head parallel to the longitudinal axis of the roll.

4. Apparatus as claimed in claim 3, further comprising means for synchronising the said relative translation and the rotation of each roll.

5. Apparatus as claimed in claim 3, further comprising means for synchronising the rotation of the disc and the rotation of each roll.

6. Apparatus as claimed in claim 4 or 5, in which the synchronising means comprise a single motor and non-sliding transmissions.

7. Apparatus as claimed in claim 1, in which each marking head includes a duct for blowing a gas onto said surface of its corresponding roll.

8. A method of forming microcavities on respective surfaces of first and second rolling mill rolls, comprising the steps of: providing a continuous laser beam; dividing the laser beam into two intermittent beams by respectively intercepting the laser beam at the periphery of a disc having a peripheral series of reflecting regions separated from one another by a series of transmitting regions and rotating the disc about an axis which is inclined with respect to the direction of the continuous laser beam such that the beam is successively transmitted through the transmitting regions and reflected by the reflecting regions; focusing a first one of the intermittent beams on said surface of the first roll; moving said surface of the first roll relative to the first intermittent beam, whereby the focused first beam forms a series of microcavities in said surface of the first roll; focusing the other intermittent beam on said surface of the second roll; and moving said surface of the second roll relative to the second intermittent beam, whereby the focused beam forms a series of microcavities in said surface of the second roll.

9. A method as claimed in claim 8, in which the laser beam has a wavelength in the far infrared range.

10. A method as claimed in claim 8, in which the laser beam has a power of 500 to 3000 W.

11. A method as claimed in claim 8, in which said surface of each roll is constituted by a coating preliminarily deposited on the roll, and the laser beam has a power of 10 to 50 W.

12. A method as claimed in claim 8, including varying the dimensions of the microcavities as a function of the position of the microcavity on the surface of the roll.

13. A method as claimed in claim 12, in which the dimensions of the microcavities is varied by modifying the power of the laser beam, a power increase causing an increase in dimensions.

14. A method as claimed in claim 13, in which the dimensions are varied in accordance with a predetermined dispersion varying the power of the laser beam about a predetermined average value.

15. A method as claimed in claim 8, in which the surface of the first roll is of steel, the method including blowing oxygen, or another gas which facilitates microcavity formation, onto said surface of the first roll at the point where the first intermittent beam is focused.

16. A method as claimed in claim 8, in which the surface of the first roll is constituted by a coating preliminarily deposited on the first roll, the method including blowing a protective gas such as argon onto said surface of the first roll at the point where the first intermittent beam is focused.

17. A method as claimed in claim 8, in which a relative pause is ensured at each instant between the point of the first roll surface at which a microcavity is formed and the point of impact of the first intermittent beam on the first roll by synchronising the movement of the first roll surface and the rotation of the disc.

18. A method as claimed in claim 8, in which the series of microcavities is caused to follow a regular helical path about the longitudinal axis of each roll by translational movement of the focused beam along each roll and rotational movement of each roll.

19. A method as claimed in claim 18, in which the microcavities form a regular hexagonal lattice on the first roll surface.

20. A method as claimed in claim 19, in which regular hexagonal lattice is obtained by synchronising the rotational of the disc and the rotation of the first roll in such a way that one revolution of the cylinder corresponds exactly to the passage of $n+\frac{1}{2}$ reflecting or transmitting regions, the helical pitch related to the distance between two successive microcavities.

21. Apparatus according to claim 3 further comprising means for synchronising the rotation of each roll with the rotation of said disc such that the location of the area at which said laser beam is focused on each roll moves in synchronism with the rotation of the disc, and such that the movement of said area on each roll is in the same direction as the movement of said rotating disc as viewed via said focusing lens from said area on the roll.

22. Apparatus according to claim 21 wherein said laser is a carbon dioxide laser.

* * * * *